(12) United States Patent
Parsons et al.

(10) Patent No.: US 7,756,879 B2
(45) Date of Patent: Jul. 13, 2010

(54) SYSTEM AND METHOD FOR ESTIMATING USER RATINGS FROM USER BEHAVIOR AND PROVIDING RECOMMENDATIONS

(75) Inventors: Jeffrey Parsons, 150 Marine Bay, Logy Bay, Newfoundland (CA) A1K 3C7; Paul Ralph, 72 Frontenac Avenue, Mt. Pearl, Newfoundland (CA) A1N 4Z4

(73) Assignees: Jeffrey Parsons, St. John's (CA); Paul Ralph, St. John's (CA)

( * ) Notice: Subject to any disclaimer, the term of this patent is extended or adjusted under 35 U.S.C. 154(b) by 355 days.

(21) Appl. No.: 11/186,951

(22) Filed: Jul. 22, 2005

(65) Prior Publication Data

US 2006/0041548 A1 Feb. 23, 2006

Related U.S. Application Data

(60) Provisional application No. 60/590,346, filed on Jul. 23, 2004.

(51) Int. Cl.
*G06F 7/00* (2006.01)
(52) U.S. Cl. .................................. 707/748
(58) Field of Classification Search ............ 707/5
See application file for complete search history.

(56) References Cited

U.S. PATENT DOCUMENTS

| | | | |
|---|---|---|---|
| 6,041,311 A | 3/2000 | Chislenko et al. | |
| 6,182,068 B1 | 1/2001 | Culliss | |
| 6,353,822 B1 | 3/2002 | Lieberman | |
| 6,438,579 B1 | 8/2002 | Hosken | |
| 6,519,571 B1* | 2/2003 | Guheen et al. | 705/14 |
| 6,539,377 B1 | 3/2003 | Culliss | |
| 6,611,881 B1 | 8/2003 | Gottfurcht et al. | |
| 2001/0013009 A1* | 8/2001 | Greening et al. | 705/10 |
| 2001/0021914 A1 | 9/2001 | Jacobi et al. | |
| 2002/0052873 A1 | 5/2002 | Delgado et al. | |
| 2002/0116291 A1* | 8/2002 | Grasso et al. | 705/27 |

(Continued)

FOREIGN PATENT DOCUMENTS

EP  0 628 919 B1  12/1994

(Continued)

OTHER PUBLICATIONS

Berlyne, D. & Lawrence, G. 1964. Effects of complexity and incongruity variables on GSR, investigatory behavior and verbally expressed preference. The Journal of General Psychology, 71, pp. 21-45.

(Continued)

*Primary Examiner*—Pierre M Vital
*Assistant Examiner*—Truong V Vo
(74) *Attorney, Agent, or Firm*—Bereskin & Parr LLP/S.E.N.C.R.L., s.r.l.

(57) ABSTRACT

A recommendation system and method for generating a set of recommended items for a user who browses items from an item data store. The recommendation system estimates ratings for at least some of the items previously viewed by the user, and then constructs a representation of the user's implicit ratings of attributes of these items. These implicit attribute ratings are then used to estimate the user's ratings for unseen items in the item data store.

34 Claims, 5 Drawing Sheets

U.S. PATENT DOCUMENTS

| | | | |
|---|---|---|---|
| 2003/0101451 A1 | 5/2003 | Bentolila et al. | |
| 2003/0105682 A1* | 6/2003 | Dicker et al. | 705/27 |
| 2003/0115333 A1* | 6/2003 | Cohen et al. | 709/227 |
| 2004/0076936 A1* | 4/2004 | Horvitz et al. | 434/236 |

FOREIGN PATENT DOCUMENTS

| | | |
|---|---|---|
| EP | 1 223 757 A2 | 7/2002 |
| WO | WO 01/37162 A2 | 5/2001 |

OTHER PUBLICATIONS

Billsus, D., Brunk, C., Evans, C., Gladish, B., & Pazzani, M. 2002. Adaptive interfaces for ubiquitous web access. Communications of the ACM, 45(5).

Burke, R. 2000. Knowledge-based Recommender Systems. In A. Kent ed., Encyclopedia of Library and Information Systems, 69, Supplement 32. Marcel Dekker, New York.

Burke, R. 1999. Integrating knowledge-based and collaborative-filtering recommender systems. Proceedings of the Workshop on AI and Electronic Commerce. AAAI 99. Orlando, Florida.

Claypool, M., Le, P., Waseda, M., & Brown, D. 2001. Implicit interest indicators. In Proceedings of the 6th International Conference on Intelligent User Interfaces (IUI '01), USA.

Cooper, M. D., & Chen, H. M. 2001. Predicting the relevance of a library catalog search. Journal of the American Society for Information Science and Technology, 52(10), pp. 813-827.

Day, H. 1966. Looking time as a function of stimulus variables and individual differences. Perceptual & Motor Skills, 22(2), Southern Universities Press, pp. 423-428.

Deerwester, S., Dumais, S., Furnas, G., Landauer, T., Harshman, R. 1990. Indexing by Latent Semantic Analysis. Journal of the American Society of Information Science.

Faw, T. & Nunnally, J. 1967. The Effects on Eye Movements of Complexity. Novelty, and Affective Tone. Perception & Psychophysics. 2(7), pp. 263-267.

Hawking, D. 1999. Results and Challenges in Web Search Evaluation. Proceedings of the 8th International World Wide Web Conference, Toronto, Canada, May 1999.

Heinrich, P. 1970. "Free looking time": A method for determining preference. Psychologie und praxis, 14(2).

Herlocker, J., Konstan, J., Borchers, A., Riedl, J. 1999 An algorithmic framework for performing collaborative filtering. SIGIR '99: Proceedings of the 22nd Annual International ACM SIGIR conference on Research and Development in Information Retrieval, pp. 230-237.

Hidi, S. 2001, Interest, reading and learning: Theoretical and practical considerations. Educational Psychology Review, 13(3), pp. 191-209.

Konstan, J., Miller, B., Maltz, D., Herlocker, J., Gordon, L., Riedl, J. 1997. GroupLens: Applying collaborative filtering to Usenet news. Communications of the ACM, 40(3), pp. 77-87.

Miller, B. N., Riedl, J. T., & Konstan, J. A. 2003. GroupLens for Usenet: Experiences in applying collaborative filtering to a social information system. In C. Lueg & D. Fisher (Eds.) From Usenet to CoWebs: Interacting With Social Information Spaces (pp. 206-231), London: Springer Press.

Mobasher B., Dai H., Luo T., Nakagawa M., Sun Y., Wiltshire J., 2002. Discovery of aggregate usage profiles for web personalization. Data Mining and Knowledge Discovery, 6(1), pp. 61-82.

Mobasher, B., Dai, H., Luo, T., Nakagawa, M. 2001. Improving the effectiveness of collaborative filtering on Anonymous Web Usage Data. Proceeding of the third international workshop on Web information and data management.

Morita, M., & Shinoda, Y. 1994. Information filtering based on user behavior analysis and best match text retrieval. In Proceedings of the 17th Annual International ACM SIGIR Conference on Research and Development in Information Retrieval (SIGIR '94), Ireland, pp. 272-281.

Oostendorp, A., & Berlyne, D. E. 1978. Dimensions in the perception of architecture II: measures of exploratory behavior. Scandinavian Journal of Psychology, 19(1), pp. 83-89.

Parsons, J. and Wand, Y. 1997. "Choosing Classes in Conceptual Modeling," Communications of the ACM, 406, pp. 63-69.

Perkowitz, M., & Etzioni, O. 2000, "Towards adaptive web sites: conceptual framework and case study," Proceedings of the Eighth World Wide Web Conference WWW8, Artificial Intelligence 118 (2000) pp. 245-275.

Sarwar, B., Konstan, J., Borchers, A., Herlocker, J., Miller, B., Riedl, J. 1998. Using filtering agents to improve prediction quality in the GroupLens research collaborative filtering system. Proceedings of the 1998 ACM Conference on Computer Supported Cooperative Work, Seattle, Washington, United States.

Schafer, J., Konstan, J., Riedl, J. 2001. E-commerce recommendation applications. Data Mining and Knowledge Discovery, 5(1/2).

Seo, Y. W., & Zhang, B. T. 2000. A reinforcement learning agent for personalized information filtering. In Proceedings of the 5th International Conference on Intelligent User Interfaces (IUI '00), USA, pp. 248-251.

Toms, E. G. 2000. Understanding and facilitating the browsing of electronic text. International Journal of Human-Computer Studies, 52(3), pp. 423-452.

Wedel, M. & Pieters, R. 2000. Eye fixations on advertisements and memory for brands: A model and findings. Marketing Science, 19(4), pp. 297-312.

\* cited by examiner

SYSTEM AND METHOD FOR ESTIMATING USER RATINGS FROM USER BEHAVIOR AND PROVIDING RECOMMENDATIONS

REFERENCE TO RELATED APPLICATION

This application claims priority from U.S. Provisional Patent Application Ser. No. 60/590,346 filed on Jul. 23, 2004.

FIELD OF THE INVENTION

The invention relates to a system and method for providing recommendations. More specifically, this invention relates to a system and method for providing recommendations of items to a user.

BACKGROUND OF THE INVENTION

It is becoming increasingly difficult to find information or shop online due to the size and diversity of the Web. In general, it is simply not possible to examine all available alternatives. For instance, on a typical day approximately 13 million individual products are listed on eBay. Searching a repository of this size can be frustrating and unproductive. This problem is exacerbated when the user cannot articulate specific properties of the item that is being sought, or if the user does not know exactly what is being sought, i.e. the user has the 'I'll know it when I see it' feeling. Moreover, many users enjoy arriving at the right item serendipitously, a concept difficult to incorporate into the classical notion of information search. Accordingly, effective technologies are needed to help users locate items (i.e. information, products or services).

Currently, there are three commonly employed methods of assisting online users in locating relevant items: search engines, taxonomies and recommender systems. Search engines index documents based on search terms, and are widely used for general Web searches. They allow users who can articulate what they are seeking to find items of that nature reasonably quickly. However, search engines retrieve items based on low-level features (existence of keywords), while people evaluate and use documents based on high-level concepts (such as topic). Furthermore, some research suggests that the algorithms employed by search engines ("Most Site Searches Ineffective", 2003) are not always accurate (Hawking, 1999), especially site-specific search engines, that is, those that search only the pages or items of a particular website. In addition, search engines require that the user articulate something about the target item, which requires the user to have a target item. Therefore, they are of limited usefulness to users who have a less clear picture of what they are seeking.

Taxonomies are fixed groupings of items based on a predetermined set of categories, and are commonly used to support browsing of online repositories. Taxonomies are appropriate and useful only to the extent that the chosen categories correspond to the way in which users classify the items in question (Parsons and Wand, 1997).

Automated mechanisms have the potential to help users locate the information and/or products they are seeking. Tools that improve the product/user match (i.e. decision quality) without increasing search time or cognitive effort, or that decrease search time without decreasing the product/user match, are particularly valuable. Recommender systems are one such type of tool.

Many online stores use recommender systems to personalize websites (Pine et al., 1999). Recommender systems, which provide item suggestions to users, can overcome some of the difficulties experienced by search engines and taxonomies. They have the potential to infer the high-level concepts relevant to a user and locate relevant items in a search space organized according to concepts extracted from items or item descriptions. (See Deerwester et al., 1990 for more on extracting concepts.) Moreover, recommenders need not rely on classification; they can ignore predefined categories, focusing instead on relevant properties. Recommenders can also enhance e-tailing by converting browsers into buyers, increasing cross-sells and building loyalty. Finally, recommender systems may prove useful for selecting the most relevant content especially when display screens are small, for example, when delivering news to a mobile device (Billsus et al. 2002). Recommenders have been applied in many different contexts including products, services and information.

Most current recommender systems are based on the notion that similar users have similar goals. The most popular method of exploiting this relationship, collaborative filtering (CF), involves recommending to the current user the pre-identified goals of previous, similar users. The known goals of previous users are domain-dependent and may be operationalized on an information-oriented site as the last visited page, or on an e-commerce site as products purchased. Recommenders use a variety of user-to-user similarity measures, but most build a two-dimensional ratings matrix with item on one dimension and user on the other.

Most CF-based systems require explicit user ratings and a large quantity of usage history to function effectively. Further, those using implicit ratings use primitive heuristics to estimate them. CF suffers from several limitations including sparsity, the cold start problem, the first rater problem, scalability and explicit ratings. Most users will rate only a small portion of a large set of items which makes the ratings matrix very sparse. Nearest neighbor algorithms (Herlocker et al., 1999) require a coincidence of ratings to produce user matches. That is, for two users to have a similarity, they must have both rated some set of products. The sparsity problem causes degradation in accuracy and coverage (Konstan et al., 1997 and Sarwar et al., 1998). Without sufficient ratings, the CF algorithm cannot find highly correlated users in many instances.

When a CF-based system is first used, a coldstart period begins in which the ratings matrix is empty (i.e. recommendation is impossible) or extremely sparse (i.e. recommendation quality is extremely low). Similarly, the first rater problem occurs when a new item is added—it cannot be recommended because no one has rated it. Proposed solutions to these problems involve using item-to-item similarity. In addition, the computational complexity of nearest neighbor algorithms increases with the number of products and the number of customers, limiting the scalability of such systems.

Further, most CF implementations force users to engage in the obtrusive and time-consuming task of rating items (Perkowitz et al., 2000), which may deter potential users. In many contexts, people cannot or will not explicitly rate a sufficient number of items, and even when rating sparsity is not a problem, explicitly expressed ratings may suffer from self-reporting bias. Further, questions are obtrusive and users may be reluctant to provide feedback or may provide false feedback. One solution to this problem involves using clickstream data (i.e. navigation patterns) instead of ratings (Mobasher et al., 2002).

CF-based systems that find items similar to an example item are exploiting item-to-item similarities to make recommendations. One use of such systems is to increase cross-sells, but a more sophisticated application involves the construction of a pseudo-item, the ideal item for this customer. This pseudo item is operationalized as a vector in the same format as item vectors, see Deerwester et al. (1990). This representation can be compared to representations of real items using the techniques described by Deerwester. The item-to-item system then recommends the item(s) closest to the pseudo-item. Latent Semantic Indexing (LSI) (Deerwester et al., 1990) is one technology capable of uncovering the latent semantic relationships among documents based only on their keywords.

LSI works by constructing vectors that represent documents and using measures of distances between vectors to indicate the similarity of the corresponding documents. First, each document in a corpus is reduced to a vector of keyword frequencies. After using singular value decomposition to reduce dimensionality, the similarity between any documents can be measured by a function of the angle between their vectors (Deerwester et al., 1990) or a function of the distance between their corresponding points in the solution space. In a document-search context, the pseudo-document vector might be created by taking a weighted average of the vectors of all documents rated so far, with the weights calculated from the ratings. Because LSI extracts conceptual information, it resolves the problems caused by the many-to-many relationship between concepts and keywords, specifically synonymy (two words having a shared meaning) and polysemy (two meanings sharing the same keyword). However, LSI is intended for unstructured data, such as natural language descriptions, and does not effectively use structured data, such as that often associated with online purchasing: price, size, etc.

FindMe systems (Burke, 2000) guide searchers through the search process by using examples. Users discard a series of unsatisfactory items by indicating which aspect of the item is most disappointing through a set of conversational buttons until an acceptable item is found. If, for example, the user indicates, "Too Expensive," the next example will be similar to the previous, but with a lower value in the cost dimension, if such an example exists. Although FindMe systems can be effective in many situations, they are inherently conspicuous; like a search tool they must be consciously selected and endured, and are therefore not appropriate where transparency is desired (see Burke (1999) and Burke (2000) for more details).

SUMMARY OF THE INVENTION

In one aspect, an embodiment of the invention provides a recommendation system for providing a recommendation set of recommended items from an item data store to a user who uses an interface to browse an item set made from items in the item data store. The recommendation system comprises a ratings estimation module that receives item property data including item attribute data for items in the item set. The ratings estimation module is connected to the interface for receiving training set data including user-specific information and is adapted to generate a training set based on at least one item browsed by the user. Further, based on at least one user-specific property and one or more item attributes, the ratings estimation module generates an item rating matrix by estimating user ratings for the items in the training set. The system also includes a recommendation module connected to the ratings estimation module for receiving the item rating matrix and the item set. The recommendation module estimates user ratings for unseen items in the item set and generates the recommendation set based on the estimated ratings.

It should be noted that the recommendation module can operate on an item rating matrix, regardless of the source of the ratings comprising the item rating matrix. Further, the item rating matrix can be composed of explicit ratings or ratings based on one or more other rating estimation techniques or some combination thereof, the recommendation module may still be applied.

A rating represents the user's attitude toward some item on a dimension. The recommendation system can be used with ratings on many dimensions, including, but not limited to: interest, preference and propensity to buy.

The ratings estimation module can include a training set generator for generating the training set based on the training set data and the item property data for at least some of the items viewed by the user; a data pre-processing module connected to the training set generator for receiving the training set and generating pre-processed training set data by applying zero or more statistical transformations; and, a user ratings estimator connected to the data pre-processing module for receiving the pre-processed training set data and generating the item rating matrix.

The user ratings estimator may generate an entry in the item rating matrix for a training set item e based on a combination of item attribute values and at least one rating predictor variable of the training set item e.

The user ratings estimator may generate item rating entries for use by the recommendation module to generate the recommendation set, wherein the user rating estimator generates an entry in the item rating matrix for a training set item e according to:

$$\text{Item Rating}_e = \frac{c + a_1 x_1 + a_2 x_2 + \ldots + a_n x_n}{3}$$

where c is a constant, each $a_i$ is a coefficient corresponding to a rating predictor variable, and each $x_i$ is a value of the $i^{th}$ rating predictor variable. The coefficients $a_i$ can be generated according to a model based on a combination of item attributes and user-specific properties.

The recommendation module includes a data pre-processing module for receiving the items in the item set and generating pre-processed items by applying zero or more statistical transformations; a user profile generator connected to the data pre-processing module for receiving the item rating matrix and generating a user profile having some subset of attributes of the pre-processed items along with at least one of an inferred user rating and explicit user rating, the inferred user rating being derived for some or all of the attributes from ratings in the item rating matrix; and, an item set rating estimator connected to the user profile generator for receiving the user profile and the pre-processed items for generating estimated user ratings for unseen items in the item set and generating the recommendation set based on the estimated user ratings for the unseen items.

The item set rating estimator may generate estimated user ratings for unseen items in the item set and the recommendation module uses the estimated user ratings to generate the recommendation set, wherein the item set rating estimator generates the estimated user rating for an unseen item e according to $$Rating_e = \frac{\sum_{i=1}^{|R|} r_i w_i}{\sum_{i=1}^{|W|} w_i}$$

in which $r_i$ is an attribute rating of the $i^{th}$ attribute, $w_i$ is relative importance of the $i^{th}$ attribute, $|R|$ is the number of attributes in the user profile and $|W|$ is the number of weights.

In addition to the above or in an alternative thereto, a given item may be excluded from being rated by the item set rating estimator so that the given item does not appear on the recommendation list. This can be effected by implementing a hard constraint. That is, the recommendation module, via the user profile generator for example, may be able to infer (based on viewing time for example) that a user absolutely is not interested in items having certain attributes (including product categories) or values. For example, a user viewing an outdoor equipment site may view three lanterns and spend only one second on each. Accordingly, in this instance, the recommendation module may infer that the user is not interested in lanterns and can exclude all lanterns from any recommendations made to this user.

Further, it should be noted that any multimedia or other object that can be reduced to a quantity, vector, matrix, or any other mathematical construct may give rise to one or more numeric attributes.

The numeric attributes in the user profile may be generated according to $$UQ_i = \frac{\sum_{j=1}^{|T_p|} r_j q_{ij}}{\sum_{j=1}^{|T_p|} r_j}$$

in which $r_j$ is the rating of the $j^{th}$ positive training set item, $q_{ij}$ is the value of the $i^{th}$ numeric attribute for the $j^{th}$ positive training set item and $|Tp|$ is the number of positive items. A "positive training set item" is an item with a rating greater than or equal to the positive example threshold.

The item set rating estimator may generate the recommendation set by selecting n_rec unseen items that have the highest estimated user ratings where n_rec is an integer having a value greater than or equal to one. Alternatively, the rating estimator may generate the recommendation set by selecting the unseen items having a rating that is greater than a threshold value. Alternatively, the item set rating estimator may generate the recommendation set by selecting the top n_rec rated unseen items, exceeding some threshold; that is, if fewer than n_rec unseen items exceed the threshold, this fewer number of unseen items is selected, but if more than n_rec unseen items exceed the threshold, only the top n_rec unseen items are selected.

In another aspect, an embodiment of the invention provides a method for providing a recommendation set of recommended items from an item data store to a user who uses an interface to browse an item set made from items in the item data store. The method comprises:
  a) obtaining item property data including item attribute data for items in the item set and training set data including user specific property information;
  b) generating a training set based on at least one item browsed by the user and attribute values for the at least one item;
  c) generating an item rating matrix by estimating user ratings for items in the training set based on at least one user specific property and one or more item attributes;
  d) estimating user ratings for unseen items in the item set based on the item rating matrix; and,
  e) generating the recommendation set based on the estimated ratings.

The at least one user-specific property includes viewing time of an item in the item set. Further, the method may include obtaining at least one of the age of the user, the gender of the user, the degree of experience of the user in the same or a similar setting, and the mental state of the user the at least one user-specific property.

The item attributes may include at least one of item complexity, presentation complexity, presentation length, novelty, familiarity, surprisingness, and position in the training set. Further, the item attributes may include a measure of at least one of the attributes as perceived by the user.

The method includes providing the item rating matrix by:
  a) generating pre-processed training set data items by applying zero or more statistical transformations to the training set items; and,
  b) generating an entry in the item rating matrix for a training set item e based on the item attribute values and at least one rating predictor variable of the training set item e.

Alternatively, the method may include providing the item rating matrix by:
  a) generating pre-processed training set data by applying zero or more statistical transformations to the training set items; and,
  b) generating at least one item rating entry in the item rating matrix for a training set item e, the at least one item rating entry being used to generate the recommendation set, wherein the at least one item rating entry is generated according to $$\text{Item Rating}_e = \frac{c + a_1 x_1 + a_2 x_2 + \ldots + a_n x_n}{3}$$

where c is a constant, each $a_i$ is a coefficient corresponding to a rating predictor variable, and each $x_i$ is a value of the $i^{th}$ rating predictor variable and where the coefficients $a_i$ are generated according to a model based on a combination of item attributes and user-specific properties.

The method includes estimating user ratings for unseen items by:
  a) generating pre-processed items by applying zero or more statistical transformations to the unseen items in the item set;
  b) generating a user profile having some subset of attributes of the pre-processed items along with at least one of an inferred user rating and explicit user rating, the inferred user rating being derived for some or all of the attributes from ratings in the item rating matrix; and,
  c) generating the estimated user ratings for some or all of the unseen items in the item set based on the estimated user ratings for the items.

The method further includes generating estimated user ratings for unseen items in the item set and using the estimated user ratings to generate the recommendation set, wherein estimating the item rating for an unseen item e is done according to $$Rating_e = \frac{\sum_{i=1}^{|R|} r_i w_i}{\sum_{i=1}^{|W|} w_i}$$

in which $r_i$ is a rating of the $i^{th}$ attribute, $w_i$ is relative importance of the $i^{th}$ attribute, $|R|$ is the number of attributes in the user profile and $|W|$ is the number of weights.

For estimating user ratings for unseen items in the item set, the method may include generating at least one of the numeric attributes in the user profile according to $$UQ_i = \frac{\sum_{j=1}^{|T_p|} r_j q_{ij}}{\sum_{j=1}^{|T_p|} r_j}$$

in which $r_j$ is the rating of the $j^{th}$ positive item in the training set, $q_{ij}$ is the value of the $i^{th}$ numeric attribute for the $j^{th}$ positive item in the training set and $|Tp|$ is the number of positive items where a positive example is defined as a training set item with a rating exceeding some threshold, called the positive example threshold (pet).

The method may include generating the recommendation set by selecting the top n_rec rated items in the ranked recommendation set. Alternatively, the method may include generating the recommendation set by selecting the items having a rating that is greater than a threshold value. Other possibilities also exist.

BRIEF DESCRIPTION OF THE DRAWINGS

For a better understanding of the invention and to show more clearly how it may be carried into effect, reference will now be made by way of example only to the accompanying drawings which show at least one exemplary embodiment of the invention and in which.

DETAILED DESCRIPTION OF THE INVENTION

Figure 1A:
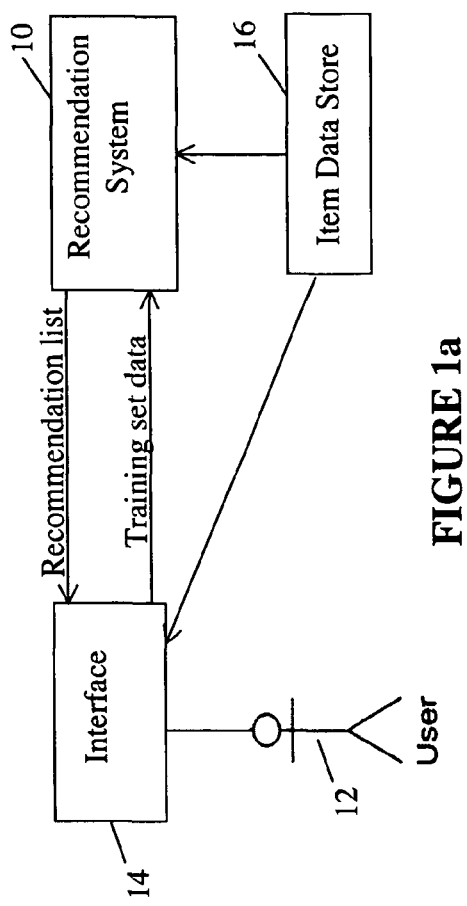
FIG. 1a is a block diagram showing a general application for a recommendation system in accordance with the invention.

Numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

The inventors have devised a recommendation system and a method for addressing the "recommendation problem" in which, given a user, u, and a set of items in an item set, the user's rating of some or all of the items in the item set on some dimension are estimated, and some of the items in the item set are placed in a list of recommended items based on the estimated ratings. That is, the first item in the list of recommended items is the item for which the estimated rating is highest; the second item in the list of recommended items is the item for which the estimated rating is second highest, and so on. In the recommendation system presented herein, ratings for seen items may be inferred from, among other things, the behavior of the user and properties of the seen items. Furthermore, ratings of the properties of the seen items may be estimated from, among other things, ratings of the seen items. Furthermore, ratings of the properties of unseen items may be estimated from, among other things, ratings of the properties of seen items. Furthermore, ratings of unseen items may be estimated from, among other things, ratings of the properties of the unseen items. The properties for an item include one or more of text attributes and/or numeric attributes. For example, for a book, the title and author of the book are text attributes that may be used while the price, the edition and the number of pages are numeric attributes that may be used. Other examples of values for numeric attributes include temperature (in which case the value 0, i.e. Celsius or Fahrenheit, does not mean none), and intervals such as the range of 10 degrees Celsius to 20 degrees Celsius which in terms of magnitude is similar to the range of 20 degrees Celsius to 30 degrees Celsius. These examples illustrate the different between scale, interval and ordinal numeric data. Further, a far from exhaustive list of exemplary behaviors of the user for an online embodiment of the invention may include: the user's viewing times of the seen items, user interaction with multimedia features of pages, mouse movement and backtracking.

As an example of how an online behavior might be used to generate ratings implicitly, consider a user interacting with an electronic repository. This may be an online catalog or a collection of articles on a newsgroup site, etc. In general, one would expect users to look at items they like, or find interesting, for a longer time than items that they do not like, or do not find interesting. In an information-seeking context, this translates into an expectation that users will view relevant information for a longer time (and read more of it) than irrelevant information. In a shopping context, users should spend more time examining items they like for a longer time than items that they do not like. Thus, viewing times may contribute to generating implicit ratings of a user's preference for or interest in an item, or the user's propensity to purchase or consume an item.

There is some indirect evidence in the psychology literature of a relationship between viewing time and preference. Past studies have not looked directly at preference, but at constructs that can be argued to be correlates of preference. For instance, Faw et al. (1967) found that "pleasant ratings" were shown to be positively correlated with viewing time and Day (1966) reported that 27 out of 30 participants looked longer at images rated "liked." Oostendorp et al. (1978) found that "looking time increased with the hedonic tone/arousal factor scores," meaning that items evoking pleasurable emotions were viewed for longer periods. Claypool et al. (2001) found that viewing time was positively related to interest. A positive relationship was identified between relevance and viewing time by Cooper et al. (2001), Miller et al. (2003) and Seo et al. (2000).

More recently, and in an online context, Konstan et al. (1997) found a positive relationship between reading time of Usenet news and explicit ratings. In addition, Mobasher et al. (2001) attempted to use viewing time to indicate the significance of page views with some success. Morita et al. (1994) also concluded that time spent reading Usenet news was positively related with interest. However, other factors could affect viewing time, particularly in an uncontrolled setting (e.g. the amount of visual detail, the amount of text, distractions on images, other distractions from a browsing/purchase task).

In a study conducted by the inventors, participants browsed a simulated electronic catalog, added preferred items to a virtual shopping basket and eventually picked a favorite. Participant's viewing times for basket items exceeded those for non-basket items, indicating a positive relationship between viewing time and propensity to consume. In another study, the inventors used normalized viewing time as an implicit indicator of preference in combination with a content-based recommendation system in accordance with the invention. The inventors found that this combination outperformed random recommendations, supporting the notion that preference is positively related to viewing time.

Referring now to FIG. 1a, shown therein is a block diagram of a general exemplary application for a recommendation system 10 in accordance with the invention. The recommendation system 10 provides a set of recommended items for a user 12 who uses an interface 14 to interact with an item list made from items contained in an item data store 16. The item list includes a variety of items that may be searched and viewed by the user 12. The items may include a wide variety of consumables; anything that can be viewed, read, purchased or otherwise consumed. The item data store 16 may be a catalog of shopping items or a repository of data, such as technical articles, that the user 12 accesses to obtain information on a particular subject.

The recommendation system 10 and the interface 14 may be implemented in several ways. In one exemplary embodiment, the recommendation system 10 and the interface 14 may be implemented as a kiosk that consumers interact with in a store to find useful, desirable, or interesting items. In this implementation, the interface 14 includes a display and an input device such as a keyboard, mouse, trackball, touch sensitive screen, and the like. The interface 14 may also include an output device that provides a hardcopy of the recommended items. In addition, or in an alternative, the system 10 may provide the results to the user 14 in another fashion such as emailing a list of the recommended items, or providing some other suitable output. The user 14 interacts with the recommendation system 10 via the interface 14 to browse the item list for a particular item that they find useful, desirable or interesting. The recommendation system 10 and the item data store 16 may be implemented at a remote location and connected to the kiosk via an appropriate communication network.

In use, the interface 14 provides the recommendation system 10 with information on the actions of the user 12 with relation to at least one item in the item data store 16. This information is generally referred to herein as training data and will be explained in more detail below. The recommendation system 10 then operates on the training data and item property data based on the items in the item data store 16 to generate a recommendation list that is then provided to the user 12 via the interface 14. The interface 14 is also connected to the item data store 16 to allow the user 12 to view items in the item data store 16.

Figure 1B:
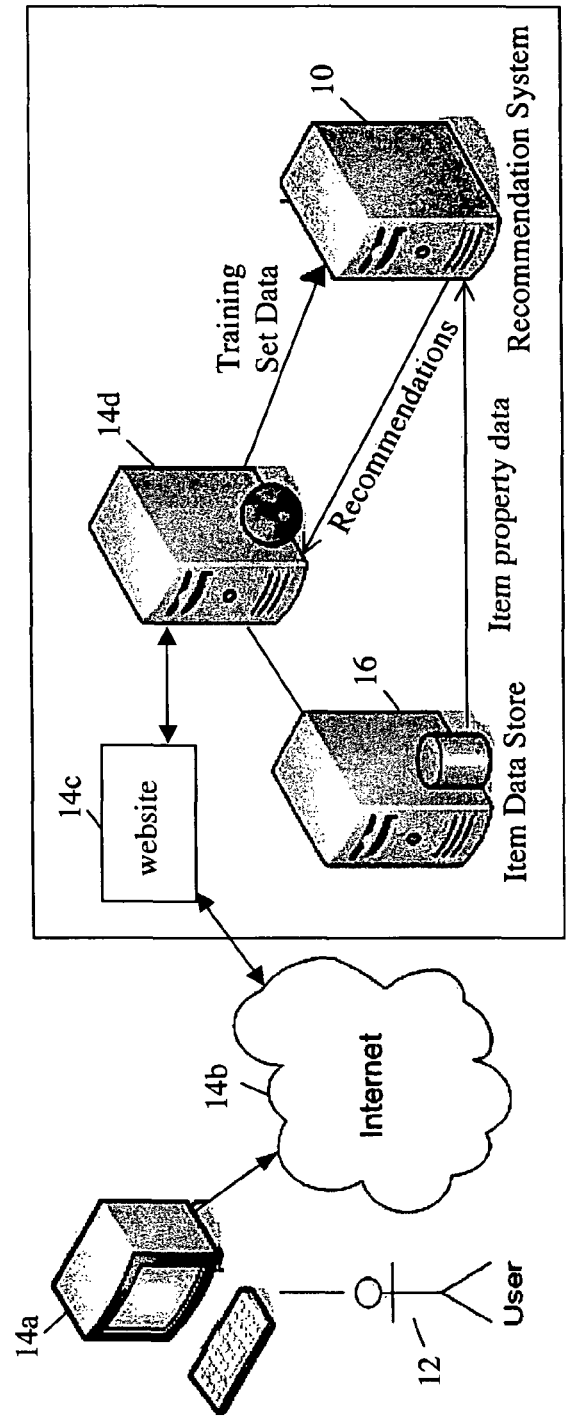
FIG. 1b is a block diagram showing another exemplary application for a recommendation system in accordance with the invention.

Referring now to FIG. 1b, shown therein is a block diagram of another exemplary application for the recommendation system 10 in accordance with the invention in which the recommendation system 10 is available to the user 12 in an online context. In this exemplary implementation, the interface 14 is somewhat more distributed and is provided by a computer 14a that connects, via a network connection 14b (such as the internet for example), to a website 14c that is hosted on a web server 14d. The web server 14d is connected to the recommendation system 10 and the item data store 16. In one implementation, the recommendation system 10, the web server 14d, and the item data store 16 may be implemented by separate servers. In another implementation, two of the recommendation system 10, the web server 14d and the item data store 16 may be implemented on one server and the other on another server. In another alternative, one server may be used and the web server 14d, and the recommendation system 10 may be software implemented and the item data store 16 may be provided by a relational database. In each of these cases, the server may be replaced by some other suitable hardware device as is commonly known to those skilled in the art.

In both of the embodiments shown in FIGS. 1a and 1b, the one or more elements of the recommendation system 10 generally interact with the interface 14 to obtain the training data which is discussed in more detail below. In addition, various alternative configurations are possible for the relation of the item data store 16 with respect to the recommendation system 10 and for the generation of the item property data. These alternatives are discussed in further detail below.

In use, the web sever 14d provides the recommendation system 10 with training data based on the actions of the user 12 with relation to at least one item in the item data store 16. As in the configuration of FIG. 1a, the recommendation system 10 then operates on the training data and item property data from the item data store 16 to generate a recommendation list that is then provided to the user 12 via the website 14c. The web server 14d is also connected to the item data store 16 to allow the user 12 to view items from the item data store 16 on the website 14c.

In one embodiment, the recommendation system 10 is an item-to-user recommendation system that preferably infers ratings on seen items based on behaviors (such as viewing time for example) and item attributes (such as complexity for example) with a content-based recommendation module that infers ratings of unseen items based on the ratings of seen items and other information, including but not limited to, item property data (such as price for example) and training data including user-specific properties such as browsing behavior and gender for example. In other words, given an item set from the item data store 16 and properties of the user 12, the recommendation system 10 returns a list of items (i.e. a recommendation set or list) that are sorted by the user's rating of the item, or the recommender's estimated user rating.

The recommendation system 10 preferably satisfies two conditions: transparency and user independence. The recommendation system 10 is transparent since the user 12 does not have to be aware of, or explicitly interact with, the recommendation system 10 for the recommendation set to be generated. The recommendation system 10 is also preferably user independent since the recommendation set provided to the user 12 is not contingent upon knowledge of any other user.

Figure 2A:
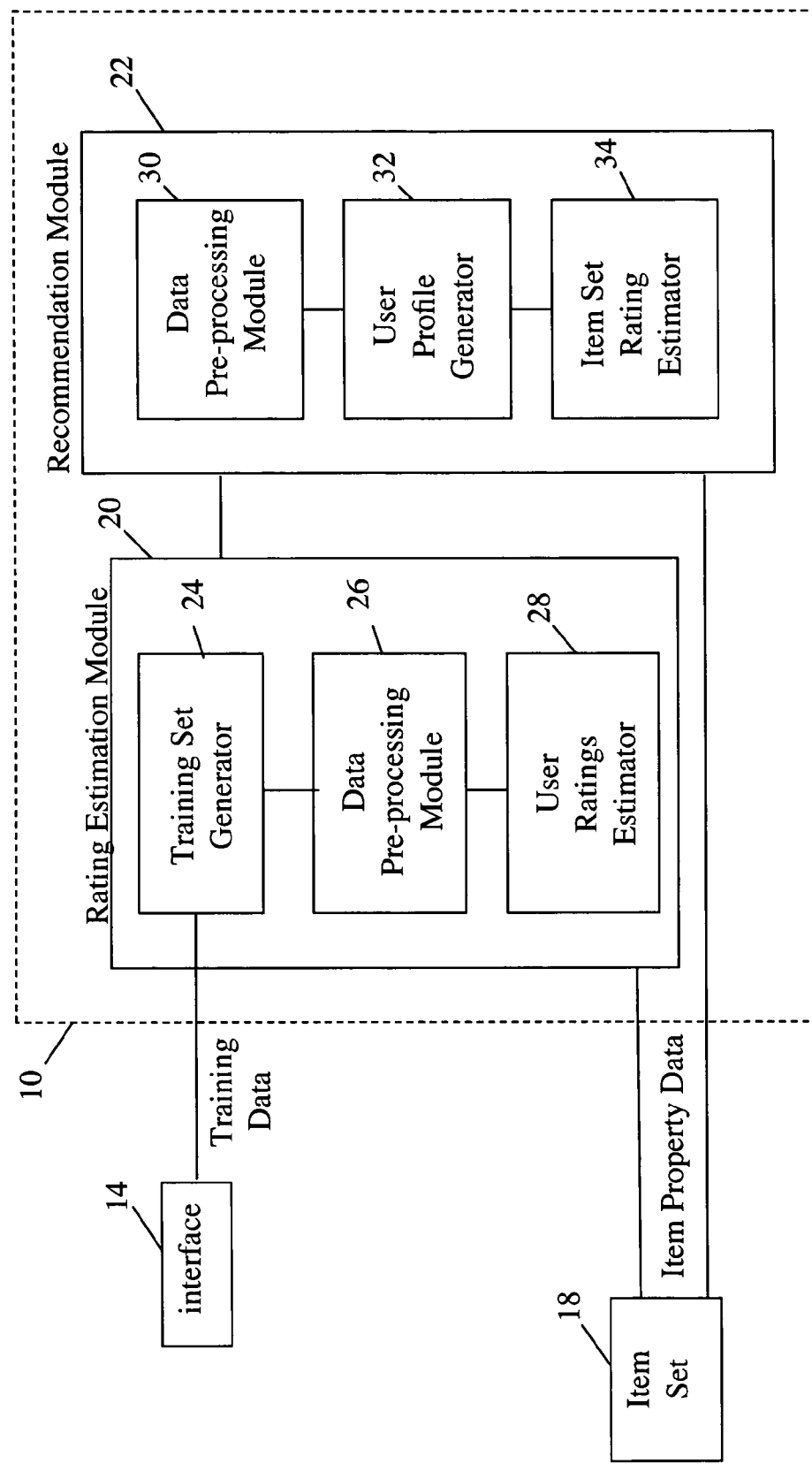
FIG. 2a is a block diagram of an exemplary embodiment of the recommendation system of FIGS. 1a and 1b.

Referring next to FIG. 2a, shown therein is a block diagram of an exemplary embodiment of the recommendation system 10 in accordance with the invention. The recommendation system 10 interacts with an item set 18 and includes a rating estimation module 20 and a recommendation module 22 connected as shown. In this embodiment, the rating estimation module 20 includes a training set generator 24, a data pre-processing module 26 and a user ratings estimator 28. The recommendation module 22 includes a data pre-processing module 30, a user profile generator 32, and an item set ratings estimator 34.

To facilitate the description of the recommendation system 10, a list of the terms and their meanings is provided in Table 1

TABLE 1

Summary of Terminology for the Recommendation System

| Term | Meaning |
|---|---|
| A | the set of all attributes |
| k | the number of text attributes |
| n | the total number of attributes |
| item set | the set of all Items |
| $A_1 \ldots A_k$ | the text attributes in A |
| V | the list of encountered values for text attributes $A_1, \ldots A_k$ |
| T | the training set data |
| IR | Item/Rating matrix |
| X | the set of rating predictor variables $x_1, x_2, \ldots, x_n$ |
| u | the user profile |
| $a_i$ | Coefficient |
| IA | the Item-Attribute matrix (the item set) |
| pet | positive example threshold |
| n_rec | number of items to recommend |
| t_rec | recommendation threshold |
| Ω | recommendation set |
| UV | Target Values in user profile for text attributes |
| UQ | Target Quantities in user profile for numeric attributes |
| e | an item |
| v | a value |
| RV | Rating of Values |
| RQ | Ratings of Quantities |
| W | Relative Attribute Importance Weights |

The item data store 16 provides a collection of items that can be viewed, or otherwise browsed, ordered, purchased or read by users of the website 14c. The collection of items is referred to as the item set 18. For example, the website 14c may be an online bookstore and the items in the item data store 16 includes books. A list of the items that are in the item data store 16 may be provided by the owner of the website 14c. The item data store 16 is then generated by recording information for a number of attributes of the items. Each attribute is a property of the item. The attributes are selected such that the recommendation system 10 may make reasonable recommendations to the user 12 based on the user 12 viewing at least one item in the item data store 16. For example, for an item that is a book, the item attributes may include the title, author, price, genre, etc. of the book. The selection of attributes is discussed in further detail below.

The set of all item attributes (A) includes k attributes that have textual or category values and are referred to as text attributes. The remaining attributes in A are numeric attributes. For convenience, the set of text attributes are referenced as $A_1 \ldots A_k$ and the set of numeric attributes are referenced as $A_{k+1} \ldots A_n$. As previously mentioned, for an item that is a book, 'title' and 'author' are text attributes and 'price' and 'number of pages' are numeric attributes. Some attributes may not be used in the recommendation process. If, for example, an attribute is unique to an item, such as the title of a book, the attribute may not be useful to the recommender system 10. Values are entered for some or all of the attributes of each item in the item set database 24. Exemplary attributes are listed Table 2 for an item that is a book. This is not an exhaustive list of attributes that may be used in the recommendation system 10. In addition, different attributes can be used for different items.

TABLE 2

Exemplary Attributes

| Text Attributes | Numeric Attributes |
|---|---|
| Title | Dimensions |
| Genre | Price |
| Author | Length in Pages |
| New/used | Appropriate age range |
| Publisher | Year of Publication |
| Subject | Edition |
| Descriptive keywords | Cover-page graphic (as a vector) |
| Author's biography | Author's picture graphic |
| Descriptive text | Number in series |
| Comes with CD (yes/no) | |

Various alternative embodiments are available for the invention with regards to the item data store 16. For instance, in one embodiment, the item data store 16 is separate from the recommendation system 10 but has been preprocessed and includes the item property data in a form that is directly useable by the recommendation system 10 so that no item attributes need to be calculated. This embodiment applies to the configuration shown in FIGS. 1a, 1b and 2a.

In another embodiment, the item data store 16 is part of the recommendation system 10 and is preprocessed to include the item property data in a form that is directly useable by the recommendation system 10 so that no item attributes need to be calculated. This embodiment is not shown in any of the Figures but is can be implemented by adding a data store to the recommendation system 10.

The "internal" item data store can be a copy of the main item data store 16 with possibly fewer item attributes in some cases. For each item, a unique identifier or key may be included to link the item to the main item data store 16. The name of the item may also be included in the internal item data store as well as the item attributes that are used by the recommendation system 10. Text attributes in the internal item data store can be standardized or categorized so that the recommendation system 10 knows that these items are the same thing. For example, if an article has authors R. Brown and T. Smith, and another article has authors T. Smith and R. Brown, then these two text attributes can be put in the same category so that the recommendation system 10 recognizes that the authors are the same for these two articles. For numeric attributes, in one exemplary implementation, instead of storing the raw value, such as price which may be $49, the internal item data store may hold a z-score such as −1.457556. Note that the z-score function is only one possible method of comparing numeric attributes. The use of a preprocessed "internal" item data store will make the recommendation system 10 faster.

Figure 2B:
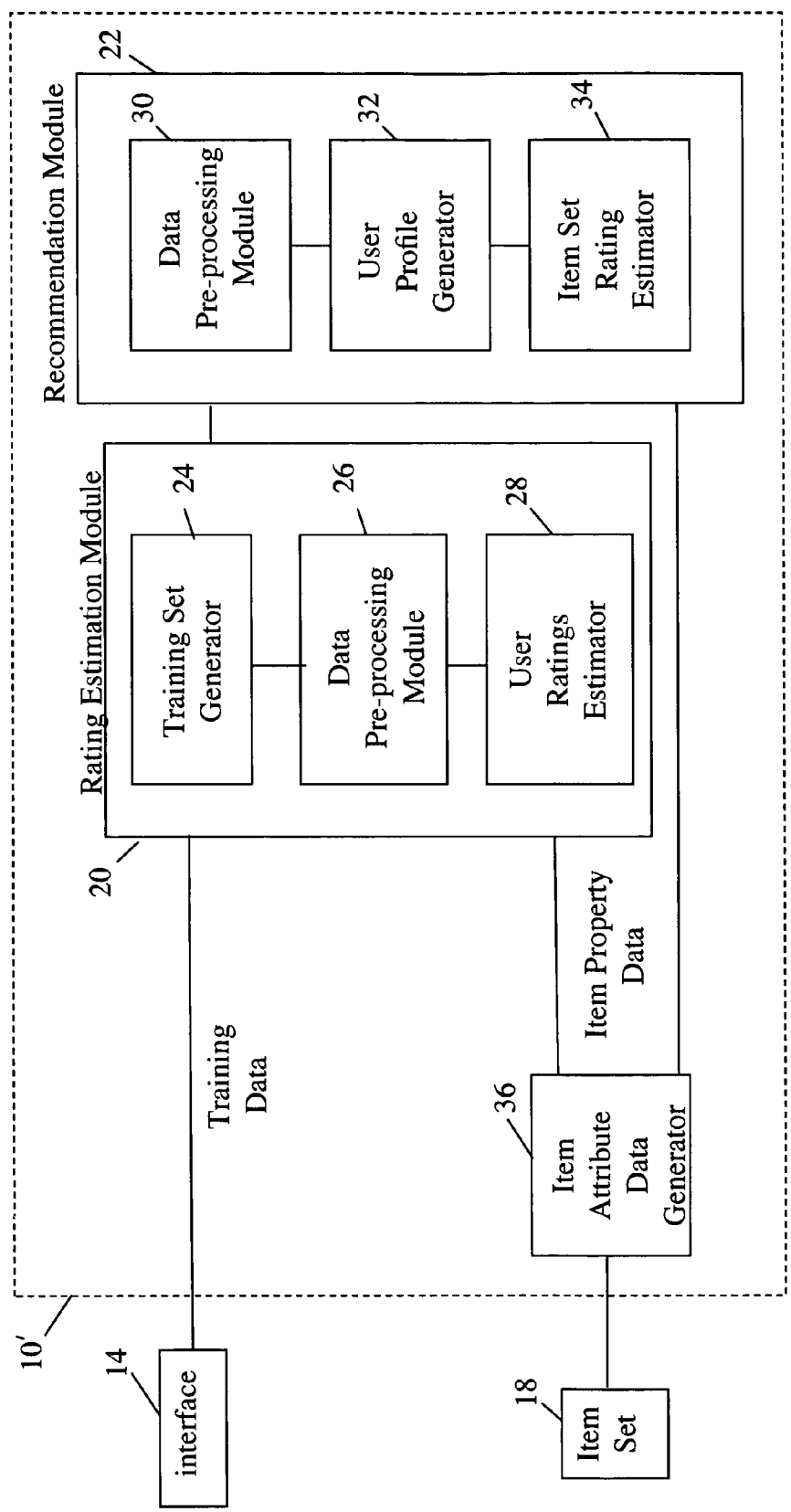
FIG. 2b is a block diagram of another exemplary embodiment of the recommendation system of FIGS. 1a and 1b.

In another embodiment, the item data store 16 is separate from the recommendation system 10 but must be pre-processed by the recommendation system 10 to generate the item attribute data (i.e. item property data). This embodiment applies to FIG. 2b which shows an alternative configuration of the recommendation system 10' which includes an additional module called the item attribute data generator 36 which preprocesses the item set provided by the item data store 16 to generate the item property data.

The rating estimation module 20 may be invoked after the user 12 has viewed a pre-specified number of items from the item data store 16. The input to the ratings estimation module 20 is the seen items and the rating predictor variables ($x_i$'s) which may be based on at least one user-specific property. The seen items are provided in the training set data supplied by the web server 14d and the rating predictor variables ($x_i$'s) are included in the item property data provided by the item data store 16. The recommendation system 10 may be fine-tuned by specifying a minimum number of items that need to be viewed by the user 12 before the recommendation system 10 provides a recommended set of items. The quality of recommendation increases when the number of items viewed by the user 12 increases. The output provided by the rating estimation module 20 is an array of item/rating pairs or an item/rating matrix (IR).

The set of items seen by the user 12 at the time the recommendation process is begun is included in the training set T and the items in the training set are referred to as training set items. The training set T is generated by the training set generator 24 based on at least one of the items that have been seen by the user 12 by predicting ratings for those items based on the attributes of those items that are provided in the item property data and behavior specific to the user 12. To accomplish this, the training set generator 24, and more generally the ratings estimation module 20, requests the training data from the interface 14. In one embodiment of the recommendation system 10, the training set generator 30 may provide the training set in such a way as to uncover information about the user 12 as quickly as possible, perhaps by including items with a broad range of attributes. In another embodiment, the recommendation system 10 may wait for the user 12 to view a pre-specified number of items before grouping the seen items into the training set T.

In general, the training set T may be a two-dimensional array in which the $i^{th}$ row contains information about the $i^{th}$ item in the training set T, the first column contains a reference to the corresponding item and the $j^{th}$ column (where j>1) contains the value for a rating predictor variable $x_{j-1}$. The value for the rating predictor variable may be specified in different ways depending on the actual variable. Some examples of rating predictor variables include viewing time, familiarity, surprisingness, and complexity.

The data pre-processing module 26 pre-processes the data in the training set by standardizing each rating predictor variable. For instance, pre-processing may be done to standardize the data so that each rating predictor variable has zero-mean and unit standard deviation. This allows comparisons to be done between different values. This may be done by applying one or more appropriate statistical operators which may depend on the underlying statistical distribution for the rating predictor variable (in some cases the data may not have to be standardized so zero transformations need to be applied). For a given rating predictor variable, the number of entries across all of the items in the training set T may be used to determine the underlying statistical distribution for that rating predictor variable. Appropriate statistical operators may then be selected to standardize the values for the rating predictor variable across each item in the training set T. If, for example, the underlying distribution is a normal distribution, then the z-score may be calculated for each rating predictor variable (the z-score may be used for other types of distributions as well).

After the data pre-processing module 26 standardizes each rating predictor variable, outliers are accounted for, a process in which two issues are preferably considered. Firstly, a method of outlier detection is chosen, and appropriate thresholds established. It should be noted that the aggressiveness of outlier detection appropriate in one situation may be less appropriate in another. In some cases, a rating predictor variable that has a value that is outside of three standard deviations of the mean might be an outlier for example (in another situation, a two-standard-deviation threshold may provide better results). Secondly, a technique must be chosen to deal with an outlier. For example, if a rating predictor variable has a value that is more than three standard deviations from the mean, this value may be considered an outlier, and the data value may be ignored, or may be reduced to 3 (or −3), etc. Many techniques are available as is commonly known by those skilled in the art.

The pre-processed training set data is then sent to the user ratings estimator 28 which estimates ratings for at least some of the seen items. The item/rating matrix IR may have up to the same number of rows as the training set T and the first column of IR is generated from the first column of T depending on the seen items for which ratings are estimated. The second column in IR contains the item rating for a given item in T. For each row in IR, the item rating may be calculated in a variety of ways, depending on the model employed. One method is to use a linear combination, as exemplified in equation 1:

$$Rating_e = \frac{c + a_1 x_1 + a_2 x_2 + \ldots + a_n x_n}{3} \quad (1)$$

where c is a constant, each $a_i$ is a coefficient corresponding to the $i^{th}$ rating predictor variable, and each $x_i$ is the value of the $i^{th}$ rating predictor variable. Values for c and $a_i$ are picked by the statistical technique used to generate the model. Viewing time may be one of the rating predictor variables. The rating may be generated for each item viewed. The values of the rating predictor variables depend on the item viewed. The value for the Item $Rating_e$ is preferably transformed to be in the range of [−1, 1]. Alternatively, rather than using equation 1, a model may be generated using a structural equations modeling technique, or a function of a "probability function" from a Discriminant analysis. There are many techniques available to one skilled in the art for specifying such a model.

The entries $x_i$ may represent any relevant factor including, but not limited to, viewing time, sequence position, item familiarity, class familiarity, item surprisingness, page complexity, page length, item complexity and item novelty. These factors may be derived from studies or surveys in which participants indicate, explicitly or implicitly, which factors influence their ratings of items, or from psychological literature on this and related subjects. As discussed above, many methods exist for estimating a rating from this data. Although a linear combination approach is shown, a non-linear combination may be used instead as is done in more complex models. For any application, it may be best to test, via simulation, several models to find the best one.

The recommendation module 22 assigns an estimated rating to some or all of the items in the item set 18 that the user 12 has not seen and provides a set of recommended items to the user 12. To this end, the recommendation module 22 exploits, among other things, the ratings estimated by the user ratings estimator 28. The recommendation module 22 receives the item set 18, the IR matrix from the user ratings estimator 28 as well as recommendation criteria used to produce recommendations. The recommendation criteria may include a positive example threshold (pet) which, in this embodiment, is a number between −1 and 1 that identifies the minimum value that a rating must have to be considered positive. The recommendation criteria may also include a parameter n_rec which is the number of items to recommend or t_rec which is a recommendation threshold. The value of n_rec is greater than zero and less than the total number of items in the item set 18, and t_rec may have the same range as the estimated ratings. The output of the recommendation module 22 is a set of recommended items which may also include the rating that is estimated for each recommended item. The items in the recommended item set may be the top n_rec items or the items that were above the t_rec threshold. Alternatively, the user ratings estimator 28 may generate the recommendation set by selecting the top n_rec rated items, exceeding some threshold. In other words, if fewer than n_rec items exceed the threshold, then this fewer number of items is selected for the recommendation set, but if more than n_rec items exceed the threshold, then only the top n_rec items are selected for the recommendation set. In another alternative, the item set rating estimator 28 may generate the recommendation set only when the estimated user rating of at least one of the unseen items exceeds the estimated user ratings of all items previously viewed by the user.

The data pre-processing module 30 standardizes the values of numeric attributes of the items so that these attributes have zero mean and unit standard deviation by employing an appropriate statistical operator. For instance, if the numeric property data is characterized by a normal distribution, then the z-score may be calculated for each variable (the z-score may be used for other types of distributions as well). In some cases, the data pre-processing module 30 may not have to apply any transformations; in general it applies zero or more transformations. For example, a transformation does not need to be applied if the raw attribute values are distributed uniformly on a scale of [−1, 1].

The user profile generator 32 receives the standardized data and estimates the ratings of the user 12 for the unseen items in the item set 18 in terms of ratings of item attributes. For example, for books, some attributes may be author, genre and price. Now consider a specific book in the training set T with the following values for the attributes just mentioned: "J. R. R. Tolkien", "Fantasy" and $12.95. The first two attributes are text, and the third is numeric. Some or all of the values for text attributes of the training set items can be in a list of encountered values, V. In one embodiment, the list V may contain every text attribute value that is ascribed to a seen item. In an alternative embodiment, the list V may contain a subset of the text attribute values that were ascribed to at least one seen item. The rating associated with each value is some function of all of the ratings of all of the items in the training set T having that value. For example, if three of the items rated (perhaps implicitly) by the user have the color red, the rating of 'red' might be calculated as the average of the ratings of the three items. Where an item, e, has multiple values for a text attribute, the rating of the text attribute can be calculated on the basis of the rating of each value of the attribute for the item e. For example, if a shirt has three colors, black, white and red, the rating of each color can be calculated as described earlier in this paragraph, and the rating given to the shirt's color may be a function of the ratings of each color, such as an average. Given multiple values for a single attribute (as in a multi-colored jacket), several methods exist to combine the ratings of each value to produce a rating for the attribute. For instance, one may take the Mean, Maximum or Minimum of the ratings. Alternatively, Dempster-Shafer theory could be used to estimate the rating of a multi-valued attribute.

Two illustrate Dempster-Shafer theory, consider a jacket, j, with three colors: white, black and red, with ratings $r_1$, $r_2$, and $r_3$ respectively, the following pseudo-code may be used to determine the rating of color:

```
if (e₁ > 0 AND e₂ > 0)
    Score(j | e₁, e₂) = e₁ + e₂(1 − e₁)
else if (e₁ < 0 & e₂ < 0)
    Score(j | e₁, e₂) = e₁ + e₂(1 + e₁)
else
    Score(j | e₁, e₂) = (e₁ + e₂)/(1 − min(|e₁|, |e₂|))
```

The variables $e_1$ and $e_2$ represent ratings of values. Accordingly, if only two values exist, and hence two ratings $r_1$ and $r_2$ are given, then $e_1$ may be set to one of $r_1$ and $r_2$ and $e_2$ is set to the other of $r_1$ and $r_2$. When more than two values exist, the formula can be used iteratively, that is, by substituting $r_1$ and $r_2$ for $e_1$ and $e_2$ in the first iteration, and substituting the result of the first iteration and $r_3$ for $e_1$ and $e_2$ in the second iteration. This more sophisticated method may provide better results in some situations.

For some or all numeric attributes, in one exemplary embodiment, only the items in the training set T that have a rating value greater than the positive example threshold (pet) can be retained to form a subset T' from the training set T. The target quantities in the user profile, for some or all of the numeric attributes can then be generated from the numeric values for that attribute in the items in the subset T'. For example, a weighted average may be used, where the weights can correspond to the ratings of the items. Thresholding can be done to find the target quantity of a numeric attribute in the user profile so that the items that received positive feedback are retained and the other items ignored. The pet value is carefully chosen so that negative items do not distort the target quantities. All of the processed information for the text and numeric attributes is stored in the user profile (u).

The user profile (u) is a storage container that holds some or all of the data obtained about the user 12. The rating data for text attributes is separated from the rating data for numeric attributes to take advantage of scaling properties. For instance, 'red' is not less than 'brown' so red and brown can be considered values of a text attribute. However, 7 buttons is less than 10 buttons so 7 and 10 can be considered values for a numeric attribute. Where a numeric attribute was not interval, that is, the distance between 1 and 2 is not necessarily equal to the distance between 2 and 3, recommendation accuracy may be higher in some cases if such a numeric attribute were treated as a text attribute. For instance, the edition of a book is an example of an ordinal variable. Editions indicate some order, but the difference or distance between editions is not the same as other intervals such as the year of publication.

In general, the user profile (u) contains a set of values UV for the text attributes and a set of values UQ for the numeric attributes. For some or all of the elements in the set V, a corresponding element is created in UV that is a function of the ratings of all of the items in the training set T that contain the particular value. Many functions are possible; one choice may be to use the arithmetic average function. However, special care is needed for some items in the training set T that have multiple values for an attribute. In this case, several options exist: the means of the ratings of the values may be used, the maximum rating may be used (an optimistic approach) or the minimum rating may be used (a pessimistic approach). Single-valued attribute ratings may take precedence over the presumably harder to interpret multi-valued attribute ratings.

The set of values UQ for the numeric attributes are each based on a function of the rated values that have been retained for the given attribute after applying thresholding using the pet value. A similar concept can be used for text or categorical attributes to exclude items with attributes having certain values by applying a threshold to a related numeric attribute. For instance, if one were browsing videos to buy then some videos with a certain actor may be excluded based on the user spending very little time looking at some videos that include the actor.

A positive item is an item that has a rating that has a value greater than the pet value. An exemplary function may be the mean or a weighted mean in which the weights are defined by rating values in the training set. Different functions may be used for different attributes. A weighted mean may be defined as in equation 2:

$$UQ_a = \frac{\sum_{j=1}^{|T|} r_j q_{ij}}{\sum_{J=1}^{|T|} r_j} \quad \text{for each } r \in R | r > pet \quad (2)$$

in which $r_j$ is the rating of the $j^{th}$ positive item in the training set T, $q_{ij}$ is the value of the $i^{th}$ numeric attribute for the $j^{th}$ positive training set item and $|T|$ is the number of positive elements in the training set T. Accordingly, the weighted mean $UQ_a$ is the ideal or optimal quantity of numeric attribute a for the user 12.

Once the user profile u is constructed, the ratings for the unseen items in the item set 18 are estimated by the item set rating estimator 34. For each item e in the item set 18 that is not in the training set T (i.e. the unseen items), the item set rating estimator 34 estimates a rating that the user 12 may give the item if asked directly. This is done by first estimating the rating of each of the attributes of item e, and then combining these attribute ratings to determine a total rating for the item e.

The user profile u includes a rating for some or all values of some or all text attributes. For a value, v, of a text attribute of the item e, the rating of v in e, may be the rating given v in UV (Target Values). However, if the value v is not in UV (i.e., has not been encountered before), then special handling is required. For example, the value v may be skipped, assigned a neutral value, or assigned a value equal to some function of the ratings for similar items. If there are multiple values for a given text attribute (for example, a book may have more than one author), then the rating given to this attribute may be some function of the ratings of the multiple value. For example, the function may be one of the mino, max( ), or mean( ) functions. The rating is then transformed by adding 1 and dividing by 2, so that it is in the range [0,1] (this is necessary for later calculations). The set of calculated ratings for the text attributes is referred to as RV (Rating of Values).

The rating of each numeric attribute a in item e is then determined. For some or all numeric attributes, the rating may be a function of a measure of the difference between the "ideal quantity" for this attribute in UQ and the actual quantity for the attribute in the item e. For example, the absolute value of the difference between the z-score of the ideal quantity and the z-score of the actual quantity in an item is the dissimilarity, which has a maximum value of 6 in this example.

In one embodiment, the rating of the numeric attribute in item e may be some function of the value of the differences between the (previously standardized) ideal quantity from UQ and the (previously standardized) values of the attribute in e. Examples of functions include the mino, max( ) or mean( ) of the difference just referred to. For example: if the ideal size of some object is 5, and item e comes in sizes 5, 6 and 7, the minimum difference between the attribute 'size' in e and the ideal quantity is 0, so the rating might be 1 (on a scale of 0 to 1).

Continuing the description of the embodiment presented in the previous paragraph, it should be noted that the ratings calculated are reversed in scale compared to the other ratings (a high value corresponds to a negative opinion). This is corrected in the following way. Since the absolute value of the difference between the ideal quantity and the actual quantity has a maximum value of 6 for the object size example, the rating obtained by taking the difference, in this example, is transformed by dividing the "difference rating" by six and subtracting the result from 1. The maximum value of 6 corresponds to a scale of −3 to 3 assuming the underlying distribution is Gaussian. Accordingly, there may be a different maximum value and different method of standardizing the calculated ratings if a different probability distribution exists for the rating predictor variables.

The item set rating estimator 34 then combines the ratings of quantities RQ and the ratings of values RV to create a single index that represents an inferred rating, $p_e$, for the item e. Several functions may be used to calculate this index. If the relative importance of the attributes with respect to the user 12 is known (or can be estimated), a weighted average may be appropriate. Otherwise, a simple average may be used. Since some attributes are more important to the buying or searching decision than others, the weighted mean is preferably used to generate the inferred rating Pe for the item e. Other functions may be appropriate, or more complex procedures such as Dempster-Shafer theory. The application of Dempster-Shafer theory here is very similar to the exemplary pseudo-code described earlier. Here the values for the item e are the ratings given to attributes, instead of the ratings given to values of an individual attribute.

In the case of a weighted average, W denotes the set of relative attribute importance weights and R is the concatenation of RV and RQ. The inferred rating $p_e$ for an item e is then given by equation 3:

$$p_e = \frac{\sum_{i=1}^{|R|} r_i w_i}{\sum_{i=1}^{|W|} w_i} \quad (3)$$

in which each attribute rating $r_i$ (the $i^{th}$ element of the set R) is multiplied by its relative importance $w_i$ (the $i^{th}$ element of the set W), summed, and then divided by the sum of the relative weights. The value $|R|$ is the number of elements in R and the value $|W|$ is the number of elements in W.

The weights W may be determined in a variety of ways depending on the context. In a purchasing context, one could perform a survey of a representative sample of customers in which the customers indicated, by means of ranking or standard scaling techniques, the importance of each property to their buying decisions. In another embodiment, another method may be to conduct a survey in which participants rate a series of items, and for each item, a selection of the item's properties. A regression analysis can then be conducted where the dependent variable is the item rating and the independent variables are the property ratings. The coefficients of the regression equation provide the relative importance of the attributes. Alternatively, if explicit ratings of items are available in addition to sufficient attribute data, the relative importance of attributes can be determined by post-hoc analysis of the data. A variety of appropriate optimization algorithms can also be used which are known to those knowledgeable in the art of mathematical and statistical modeling. The relative importance of attributes may also be calculated from industry-based surveys of the importance of various attributes to consumers of specific products. Weights may vary based on the type of users (i.e. corporate versus private), type of item (i.e. clothing versus electronics), the domain (i.e. an information search versus e-commerce), or other factors.

There is now an inferred rating $p_e$ for some or all items e in the item set 18. The item set rating estimator 34 then generates the list of recommended items Ω for presentation to the user 12. The list of recommended items Ω may be the top n_rec recommendations (that is, the n items with the highest inferred ratings) or all of the recommendations that have an inferred rating greater than a predefined threshold t_rec.

Since the user ratings estimator 28 of the recommendation system 10 generates a ratings matrix IR, the user ratings estimator 34 may be used with any recommendation algorithm that requires a ratings matrix. Further, the recommendation module 22 can operate on an item rating matrix, regardless of the source of the ratings comprising the item rating matrix. Accordingly, where an item rating matrix can be composed of explicit ratings or ratings based on one or more other rating estimation techniques or some combination thereof, the recommendation module may still be applied.

In addition to the above or in an alternative thereto, a given item may be excluded from being rated by the item set rating estimator 34 so that the given item does not appear on the recommendation list. This can be effected by implementing a hard constraint. That is, the recommendation module 22, via the user profile generator 32 for example, may be able to infer (based on viewing time for example) that a user absolutely is not interested in items having certain attributes (including product categories) or values. For example, a user viewing an outdoor equipment site may view three lanterns and spend only one second on each. Accordingly, in this instance, the recommendation module 22 may infer that the user is not interested in lanterns and can exclude all lanterns from any recommendations made to this user.

An example of an application of the recommendation system 10 now follows. For simplicity and clarity, this example uses only one rating predictor variable: viewing time. Table 3 shows an exemplary training set having 3 books as items and Table 4 shows an exemplary item set having 3 items that are books. The average viewing time for items in the training set was 28 seconds and the standard deviation in the viewing time was 14.526 seconds. The user profile is shown in Table 5. The results of the Ratings Calculation for the items in the item set are shown in Table 6. The price attribute has a mean of 22.83 and a standard deviation of 14.19. The length attribute has a mean of 707.5 and a standard deviation of 494.5898. The age attribute has a mean of 19.5 and a standard deviation of 20.859. The relative importance weights are shown in Table 7. The rating for item 4 is 0.647, for item 5 is 0.749 and for item 6 is 0.646. Accordingly, the top recommended book is Sophie's World.

TABLE 3

Exemplary Training Set

| Attribute | Item 1 | Item 2 | Item 3 |
|---|---|---|---|
| Title | Hearts in Atlantis | Lord of the Rings | Rich Dad Poor Dad |
| Author | King | Tolkein | Kiyosaki |
| Price | 40 | 15 | 23 |
| Genre | Fiction | Fantasy | Self-Help |
| Length | 600 | 1500 | 300 |
| Age | 2 | 50 | 5 |
| Viewing Time | 29 | 42 | 13 |
| Deviation from mean viewing time | 1 | 14 | −15 |
| z-score of Viewing Time | 0.069 | 0.964 | −1.033 |
| Rating | 0.023 | 0.321 | −0.344 |

TABLE 4

Exemplary Item Set

| Attribute | Item 4 | Item 5 | Item 6 |
|---|---|---|---|
| Title | Think and Grow Rich | Sophie's World | The Tommyknockers |
| Author | Hill | Garder | King |
| Price | 10 | 9 | 40 |
| Genre | Self-help | Fantasy | Fiction |
| Length | 233 | 512 | 1100 |
| Age | 42 | 8 | 10 |

TABLE 5

User Profile

| UV | | | UQ | | |
|---|---|---|---|---|---|
| Attribute | Value | Rating | Attribute | Value | Rating |
| Author | King | 0.023 | Price | 16.67 | −0.43457 |
| Author | Tolkein | 0.321 | Length | 1440 | 1.481025 |
| Author | Kiyosaki | −0.344 | Age | 46.8 | 1.308784 |
| Genre | Fiction | 0.023 | | | |
| Genre | Fantasy | 0.321 | | | |
| Genre | Self-help | −0.344 | | | |

TABLE 6

Rating Calculation

| | | | | RV | | RQ | | |
|---|---|---|---|---|---|---|---|---|
| Item | Z-price | Z-length | Z-age | Author | Genre | Price | Length | Age |
| 4 | −.0904 | −0.959 | 1.079 | null | 0.328 | 0.922 | 0.593 | 0.962 |
| 5 | −0.975 | −0.395 | −0.551 | null | 0.661 | 0.910 | 0.687 | 0.690 |
| 6 | 1.210 | 0.794 | −0.455 | 0.511 | 0.511 | 0.726 | 0.885 | 0.706 |

TABLE 7

Relative Importance Weights

| Attribute | Relative Weights |
|---|---|
| Author | 0.6 |
| Price | 0.8 |
| Genre | 0.9 |
| Length | 0.5 |
| Age | 0.3 |

Figure 3:
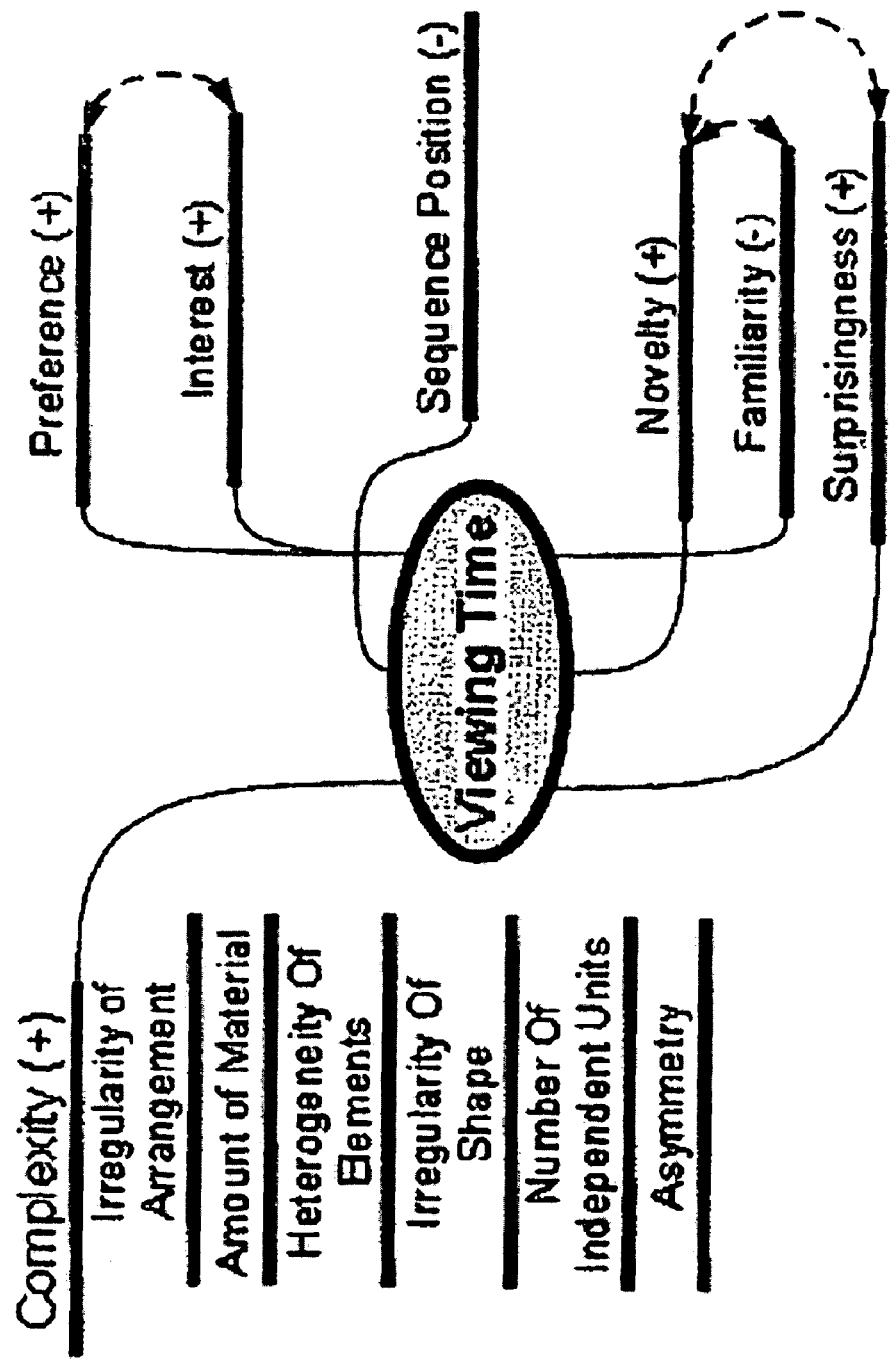
FIG. 3 shows factors that affect viewing time in a model.
Figure 4:
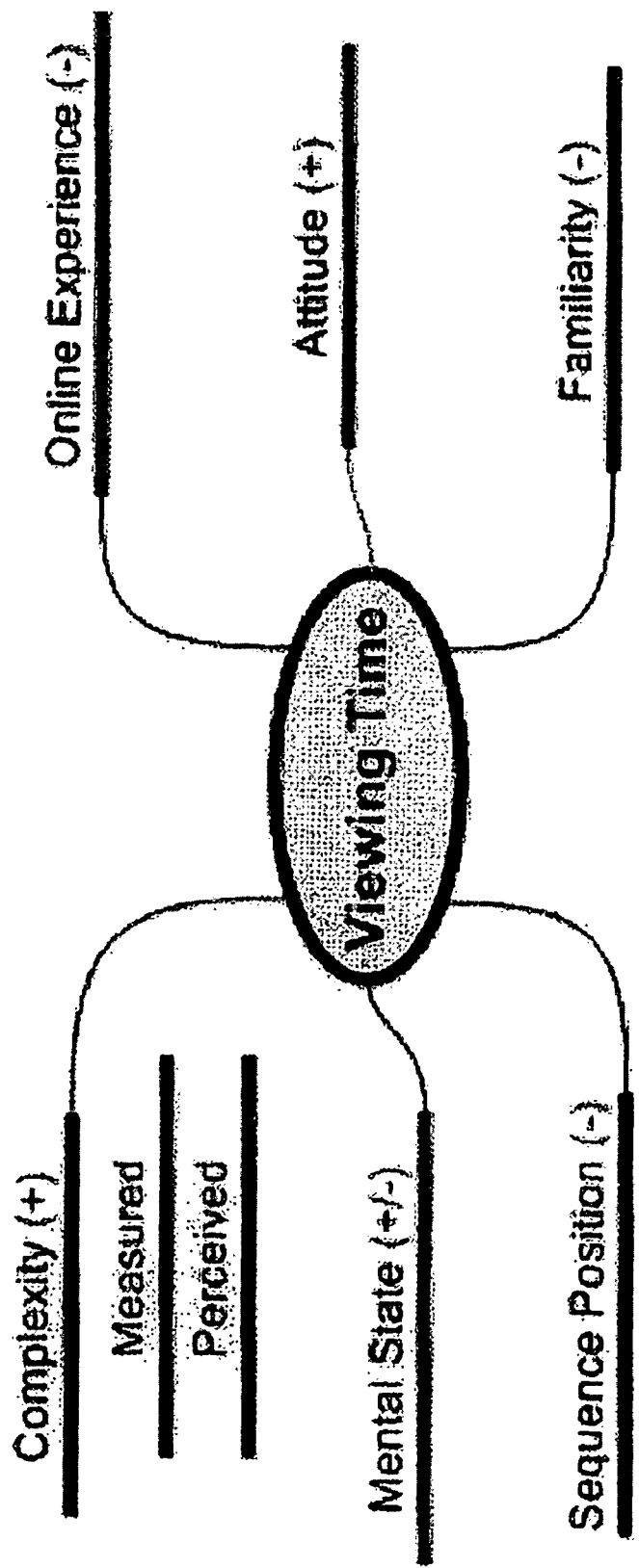
FIG. 4 shows factors that affect viewing time in an alternative model.

Prior research has shown that viewing time is positively correlated with complexity (including irregularity of shape and arrangement, amount of material and heterogeneity of elements), negatively correlated with familiarity, and positively correlated with novelty (see Heinrich (1970), Berlyne (1964), and Oostendorp et al. (1978)). The viewing time within a sequence of stimuli tends to decrease from beginning to end (Heinrich, 1970). In the e-commerce context, Wedel et al. (2000) found that people spend significantly more time looking at brand-related images rather than other images and text. This could have unexpected effects when comparing viewing times of heterogeneous pages. In addition, the positive relationship between interest and viewing time (Oostendorp et al. (1978)), which may be immediately applicable to news or other textual domains, is not equivalent to a relationship between preference and viewing time. A person may like something without being interested in it (i.e. apples), or be interested in something that the person does not like (i.e. a political scandal). The factors that affect viewing time for one model are shown in FIG. 3. The factors that affect viewing time in an alternative model are shown in FIG. 4. The plus (minus) signs indicate positive (negative) relationships and the arrows indicate potential interdependence of factors. The models presented in FIG. 3 and FIG. 4 show two different ways of representing the relationships between viewing time and several other variables, which may or may not be rating predictor variables. The models differ in granularity, the one in FIG. 4 being a more general view. These models were produced from the results of different research studies, and are meant to serve only as examples to clarify possible relationships. Not all variables that are believed to relate to viewing time are included, as this would obfuscate the general picture. The recommendation system presented herein need not be associated with any one model, but can be configured to operate with many different models of online behavior.

The inventors conducted a study to demonstrate one way in which parameter values for the $a_i$ values can be obtained in some context. Eleven variables and one constant (see Table 8) were used for the model, but additional variables might also be considered.

The participants were given a booklet that provided some information about the study. The participants were instructed to follow the online directions (the appropriate page was preloaded in a Web browser). After reading the instructions on the introduction page, participants filled out the user questionnaire. Then, participants viewed a series of 25 randomly ordered product pages. After each page, the participant was asked to rate the item and the page on several dimensions such as absolute knowledge of the item, attitude about the item based on similar items, how interesting the item was, how much the participant liked the item, how likely the participant will be to purchase the item, etc.

The participants rated 25 items, randomly selected from a database of 200. These 200 items were stored as URLs, each of which pointed to a product page obtained from an online merchant. These product pages were pseudo-randomly selected and were not meant to represent any official product selection or distribution. The items were chosen from the following categories: books, DVDs, CDs, video games, electronics, men's clothing and women's clothing.

To demonstrate one way in which parameter values may be estimated, an example using linear regression is now discussed. However, it should be understood that several different model-building techniques can be substituted for linear regression. The recommendation system 10 presented herein may be used in accordance with models constructed using many techniques, including but not limited to: Discriminant analysis, canonical correlation analysis, regression, and structural equations modeling. All of these techniques are used to quantify linear relationships between variables, that is, finding one or more combinations of independent variables that produce good estimates of one or more dependent variables. Other techniques may be appropriate, especially, but not necessarily, when non-linear relationships are present or suspected.

Since ratings could represent user responses on several dimensions, regressions were performed using three potential conceptual ratings: preference, interest, and propensity to buy. An example of a preference regression model is shown in Table 8. The preference regression model has an $R^2$ of 0.300, meaning that the independent variables in the regression explain 30% of the variance in viewing time. This is a measure of the internal predictive capability of the model. The higher the $R^2$, the better the model fits the data, and possibly the greater the accuracy of the recommendation system using the model. Obtaining a high value for $R^2$ in behavioural modeling is difficult and a value of 30% is considered good. The significance of each regressor variable is an indication of the probability that the effect of this variable is just a coincidence. A value of 0.000 should be understood to mean that the probability that the effect of the corresponding regressor variable is mere coincidence is less than 0.0005 or 0.05%; in other words, extremely unlikely.

The "Standardized Coefficients" presented in Table 8 are the coefficients used in a linear combination of the variables listed under "regressor," if the variables have been standardized (transformed to have zero mean and unit standard deviation). For example, given the equation $$Rating_e = \frac{c + a_1 x_1 + a_2 x_2 + \ldots + a_n x_n}{3},$$

the constant, c, has value 0, $x_1$, has the (standardized) value of Familiarity for item e, $x_2$ has the (standardized) value of Surprisingness, and so on; the parameter $a_1$ has a value of 0.218, the parameter $a_2$ has a value of 0.206, and so on. If the variables have not been standardized, the "raw coefficients" must be used. These are produced in the same output as the standardized coefficients, but are omitted for simplicity of presentation. It is well known to those knowledgeable in the art of mathematical and statistical modeling how the values produced by regression and other modeling techniques correspond to the variables in the theoretical model equations that underlie these techniques.

TABLE 8

A Preference Regression Model

| Regressor | Standardized Coefficients | Significance |
| --- | --- | --- |
| (Constant) | 0 | 0.916 |
| Familiarity | .218 | .000 |
| Surprisingness | .206 | .000 |
| Class Knowledge | .245 | .000 |
| Novelty | .171 | .000 |
| ln (Viewing Time) | .097 | .000 |
| Buy Online | .085 | .000 |
| Description Length | −.077 | .001 |
| Product Complexity | .126 | .000 |
| Age of User | .051 | .007 |
| Time Pressure | −.049 | .011 |
| Description Complexity | −.058 | .012 |

The elements of the recommendation system 10 described herein may be implemented through any appropriate means known in the art including computer software which may be written in Java, C++ or any other suitable programming language embodied in a computer readable medium or on a computing platform having an operating system and the associated hardware and software that is necessary to implement the recommendation system 10. The computer program includes computer instructions for performing the functionality of the various structural elements described herein. The computer programs may comprise modules or classes, as is known to those skilled in object oriented programming, that are implemented and structured according to the structure of the recommendation system 10. Accordingly, separate software modules may be designed for each component of the recommendation system 10 as appropriate. Alternatively, the functionality of these components may be combined into a smaller number of software modules where appropriate. For instance, the data pre-processing modules 32 and 36 may have the same structure.

It should be understood that various modifications can be made to the embodiments described and illustrated herein, without departing from the invention. For example, in one embodiment the Recommendation Module and Rating Estimation Module can be independent so that the Recommendation Module may work with item ratings from another source, and the Rating Estimation Module may provide Ratings to a different kind of Recommendation Module, or an unrelated process.

In addition, Latent Semantic Indexing (LSI), a technique well known to those knowledgeable in the art, may be used to index text descriptions and to compare images based on color histograms/anglograms. For instance, a picture of an item may be mathematically modeled and used to provide one or more attributes. Further, the items may be clustered. Standard clustering algorithms, such as k-means clustering, are available. Clustering may increase the execution speed of the recommendation system 10. Filters may also be used to decrease the number of items that have to be considered in the item set 18. For example, if the user 12 indicates that he/she can pay no more than $25 for an item, then all items in the item set that are over $25 can be ignored, thus reducing the number of items that need to be considered in the item set and increasing the speed of the system 10. Hierarchies or categories may also be used to decrease the number of items that have to be considered in the item set 18. Hierarchies operate in a similar fashion to filtering. For example, if the user 12 is only looking at one class of items, such as cameras, then the item list can be limited to only those objects that are related to cameras.

Further modifications may include creating a similarity measure for the name attribute; using factor analysis, principle component analysis or discriminant analysis on domain-specific surveys to derive the rating equation or updating the recommendation set dynamically, i.e. not re-running the whole algorithm each time an item is viewed. The profile data of the user (i.e. past behavior) may be integrated to determine ratings. Canonical correlation may be used which involves a linear combination of dependent variables and predicting the combination instead of individual variables like preference. Although the recommendation system was designed to circumvent a common limitation of other recommendation systems, that is, requiring explicit feedback (ratings), in a case where explicit ratings are available, the explicit ratings may be substituted for the predicted implicit ratings. For example, if a user were willing to provide explicit feedback on the recommendations received from the system, incorporating this feedback into prediction by replacing implicit ratings with explicit ratings might lead to an improvement in recommendation accuracy. The recommendation system 10 may also be reworked as an agent. To elaborate, the recommendation system 10 has been described as a server-side technology that is normally, but not necessarily, associated with a single repository and serving multiple users. The same models and techniques described herein can be applied to create a recommendation agent, i.e. a client-side technology, which usually but not necessarily serves one user, and usually but not necessarily is associated with multiple repositories.

FULL CITATIONS OF REFERENCES CITED IN THE SPECIFICATION

Berlyne, D. & Lawrence, G. 1964. Effects of complexity and incongruity variables on GSR, investigatory behavior and verbally expressed preference. *The Journal of General Psychology*, 71, pp. 21-45

Billsus, D., Brunk, C., Evans, C., Gladish, B., & Pazzani, M. 2002. Adaptive interfaces for ubiquitous web access. *Communications of the ACM*, 45(5), pp. 34-38.

Burke, R. 2000. Knowledge-based Recommender Systems. In A. Kent ed., Encyclopedia of Library and Information Systems, 69, Supplement 32. Marcel Dekker, New York.

Burke, R. 1999. Integrating knowledge-based and collaborative-filtering recommender systems. *Proceedings of the Workshop on AI and Electronic Commerce*. AAAI 99. Orlando, Fla.

Claypool, M., Le, P., Waseda, & M., Brown, D. 2001. Implicit interest indicators. In *Proceedings of the 6th International Conference on Intelligent User Interfaces (IUI '01)*, USA, pp. 33-40.

Cooper, M. D., & Chen, H. M. 2001. Predicting the relevance of a library catalog search. *Journal of the American Society for Information Science*, 52(10), pp. 813-827.

Day, H. 1966. Looking time as a function of stimulus variables and individual differences. *Perceptual & Motor Skills*, 22(2), pp. 423-428.

Deerwester, S., Dumais, S., Furnas, G., Landauer, T., Harshman, R. 1990 Indexing by Latent Semantic Analysis. *Journal of the American Society of Information Science*.

Faw, T. & Nunnally, J. 1967. The Effects on Eye Movements of Complexity, Novelty, and Affective Tone. *Perception & Psychophysics*. 2(7), pp. 263-267.

Hawking, D. 1999. Results and Challenges in Web Search Evaluation. *Proceedings of the 8th International World Wide Web Conference*, Toronto, Canada, May 1999.

Heinrich, P. 1970. Free looking time: A method for determining preference. *Psychologie undpraxis,* 14(2), pp. 79-93.

Herlocker, J., Konstan, J., Borchers, A., Riedl, J. 1999. An algorithmic framework for performing collaborative filtering. SIGIR '99: Proceedings of the 22$^{nd}$ Annual International ACM SIGIR conference on Research and Development in Information Retrieval, pp. 230-237.

Konstan, J., Miller, B., Maltz, D., Herlocker, J., Gordon, L., Riedl, J. 1997. GroupLens: Applying collaborative filtering to Usenet news. Communications of the ACM, 40(3), pp. 77-87.

Miller, B. N., Riedl, J. T., & Konstan, J. A. 2003. GroupLens for Usenet: Experiences in applying collaborative filtering to a social information system.

In C. Lueg & D. Fisher (Eds.) From Usenet to CoWebs: Interacting With Social Information Spaces (pp. 206-231), London: Springer Press.

Mobasher B., Dai H., Luo T. & Nakagawa M. 2002 Discovery and evaluation of aggregate usage profiles for web personalization. Data Mining and Knowledge Discovery, 6(1), pp. 61-82.

Mobasher, B., Dai, H., Luo, T., Nakagawa, M. 2001. Improving the effectiveness of collaborative filtering on Anonymous Web Usage Data. *Proceeding of the third international workshop on Web information and data management,* pp. 9-15.

Morita, M., & Shinoda, Y. 1994. Information filtering based on user behavior analysis and best match text retrieval. In *Proceedings of the 17$^{th}$ Annual International ACM SIGIR Conference on Research and Development in Information Retrieval (SIGIR '94),* Ireland, pp. 272-281.

Most Site Searches Ineffective. (2003). *Chain Store Age,* 79 (4): 81.

Oostendorp, A., & Berlyne, D. E. 1978. Dimensions in the perception of architecture II: measures of exploratory behavior. *Scandinavian Journal of Psychology,* 19(1), pp. 83-89.

Parsons, J. and Wand, Y. 1997. "Choosing Classes in Conceptual Modeling," *Communications of the ACM,* 406, pp. 63-69.

Perkowitz, M., & Etzioni, O. 2000, "Towards adaptive web sites: conceptual framework and case study," *Proceedings of the Eighth World Wide Web Conference WWW8.*

Pine II, B. & Gilmore, J. 1999. *The Experience Economy.* Harvard Business School Press, Boston, Mass.

Sarwar, B., Konstan, J., Brochers, A., Herlocker, J., Miller, B., Riedl, J. 1998. Using filtering agents to improve prediction quality in the grouplens research collaborative filtering system. *Proceedings of the 1998 ACM Conference on Computer Supported Cooperative Work,* Seattle, Wash., United States, pp. 345-354.

Schafer, J., Konstand, J., Riedl, J. 2001. E-commerce recommendation applications. *Data Mining and Knowledge Discovery,* 5(½), pp. 115-153.

Seo, Y. W., & Zhang, B. T. 2000. A reinforcement learning agent for personalized information filtering. In Proceedings of the 5$^{th}$ International *Conference on Intelligent User Interfaces (IUI '00),* USA, pp. 248-251.

Wedel, M. & Pieters, R. 2000. Eye fixations on advertisements and memory for brands: A model and findings. *Marketing Science,* 19(4), pp. 297-312.

The invention claimed is:

1. A recommendation system for providing a recommendation set of recommended items from an item data store to a user, the recommendation system comprising:

a memory storing the item data store;

an interface adapted to allow the user to browse an item set made from items in the item data store;

a processor connected to the memory and the interface, the processor comprising:

a ratings estimation module for:

receiving item property data comprising at least one item attribute for each item in the item set, wherein the at least one item attribute is a property of the item;

receiving training set data including user-specific information, wherein the user-specific information comprises at least one user-specific property that relates only to the user, and wherein the at least one user-specific property includes viewing time of at least one item browsed by the user, wherein the viewing time is an individual viewing time the user viewed the specific item; and generating a training set of items comprising the at least one item browsed by the user; and generating an item rating matrix by estimating user ratings for the items in the training set based on at least one rating predictor variable; wherein each rating predictor variable comprises one of the at least one user-specific property and the at least one item attribute; wherein an entry in the item rating matrix for a training set item e is generated according to:

Item Rating$_e$=$f(x_1, x_2, \ldots, x_n)$ wherein each $x_i$ is a value of the i$^{th}$ rating predictor variable, n is the number of rating predictor variables, and f is one of a non-linear combination and a linear combination of the rating predictor variables; wherein at least one of the rating predictor variables is the viewing time; and, a recommendation module connected to the ratings estimation module for receiving the item rating matrix and the item set, wherein the recommendation module (i) estimates user ratings for unseen items in the item set based on the item rating matrix without using information about any other user and (ii) generates the recommendation set based on the estimated ratings.

2. The recommendation system of claim 1, wherein the at least one user-specific property further includes at least one of the age of the user, the gender of the user, degree of experience of the user in the same or a similar setting, and the mental state of the user.

3. The recommendation system of claim 1, wherein the at least one item attribute includes at least one of item complexity, presentation complexity, presentation length, novelty, familiarity, surprisingness, and position in the training set.

4. The recommendation system of claim 3, wherein the at least one item attribute further includes a measure of the at least one item attribute as perceived by the user.

5. The recommendation system of claim 1, wherein the ratings estimation module includes:

a) a training set generator for generating the training set based on the training set data and the item property data for at least some of the items viewed by the user;

b) a data pre-processing module connected to the training set generator for receiving the training set and generating pre-processed training set data by applying zero or more statistical transformations; and, c) a user ratings estimator connected to the data pre-processing module for receiving the pre-processed training set data and generating the item rating matrix.

6. The recommendation system of claim 5, wherein the user ratings estimator generates an entry in the item rating matrix for a training set item e based on a combination of the at least one item attribute and at least one rating predictor variable of the training set item e.

7. The recommendation system of claim 5, wherein the user rating estimator generates item rating entries for use by the recommendation module to generate the recommendation set, wherein the user rating estimator generates an entry in the item rating matrix for a training set item e according to:

$$Item\ Rating_e = \frac{c + a_1 x_1 + a_2 x_2 + \ldots + a_n x_n}{3}$$

where c is a constant, each $a_i$ is a coefficient corresponding to a rating predictor variable, and each $x_i$ is a value of the $i^{th}$ rating predictor variable and where the coefficients $a_i$ are generated according to a model based on a combination of the at least one item attribute and the at least one user-specific property.

8. The recommendation system of claim 7, wherein the model is based on one of: linear regression, discriminant analysis, canonical correlation analysis, and structural equations modeling.

9. The recommendation system of claim 1, wherein the recommendation module includes:
 a) a data pre-processing module for receiving the items in the item set and generating pre-processed items by applying zero or more statistical transformations;
 b) a user profile generator connected to the data pre-processing module for receiving the item rating matrix and generating a user profile having some subset of attributes of the pre-processed items along with at least one of an inferred user rating and explicit user rating, the inferred user rating being derived for some or all of the attributes from ratings in the item rating matrix; and,
 c) an item set rating estimator connected to the user profile generator for receiving the user profile and the pre-processed items for generating estimated user ratings for unseen items in the item set and generating the recommendation set based on the estimated user ratings for the unseen items.

10. The recommendation system of claim 9, wherein the item set rating estimator generates estimated user ratings for unseen items in the item set and the recommendation module uses the estimated user ratings to generate the recommendation set, wherein the item set rating estimator generates the estimated user rating for an unseen item e according to $$Rating_e = \frac{\sum_{i=1}^{|R|} r_i w_i}{\sum_{i=1}^{|W|} w_i}$$

in which $r_i$ is an attribute rating of the $i^{th}$ attribute, $w_i$ is relative importance of the $i^{th}$ attribute, $|R|$ is the number of attributes in the user profile and $|W|$ is the number of weights.

11. The recommendation system of claim 9, wherein the at least one item attribute includes at least one of a text attribute and a numeric attribute.

12. The recommendation system of claim 11, wherein the numeric attribute in the user profile is generated according to $$UQ_i = \frac{\sum_{j=1}^{|Tp|} r_j q_{ij}}{\sum_{j=1}^{|Tp|} r_j}$$

in which $r_j$ is the rating of the $j^{th}$ positive item in the training set, $q_{ij}$ is the value of the $i^{th}$ numeric attribute for the $j^{th}$ positive training set item and $|Tp|$ is the number of positive items and wherein a positive item is defined as an item having an attribute value greater than a predefined threshold value.

13. The recommendation system of claim 9, wherein for at least some numeric attributes, the user profile generator selects a subset of items in the training set to generate the user profile, the subset being selected based on items in the training set having a rating greater than a predefined threshold value.

14. The recommendation system of claim 9, wherein the item set rating estimator generates the recommendation set by selecting n_rec unseen items having the highest estimated user ratings where n_rec is an integer value greater than or equal to one.

15. The recommendation system of claim 9, wherein the item set rating estimator generates the recommendation set by selecting the unseen items having an estimated user rating that is greater than a threshold value.

16. The recommendation system of claim 9, wherein the item set rating estimator places a given unseen item in the recommendation set only when the estimated user rating of the given unseen item exceeds the estimated user ratings of all items previously viewed by the user.

17. The recommendation system of claim 1, wherein the recommendation module, based on the user-specific information, is adapted for inferring that the user is not interested in unseen items having a certain attribute and does not recommend these unseen items.

18. The recommendation system of claim 1, wherein the recommendation system includes the item data store, and the item data store is preprocessed to provide the item property data.

19. The recommendation system of claim 1, wherein the item data store is separate from the recommendation system, and the recommendation system further includes an item attribute data generator for processing the items in the item data store to generate the item property data.

20. A method for providing a recommendation set of recommended items from an item data store to a user who uses an interface to browse an item set made from items in the item data store, the method including:
 a) obtaining item property data comprising at least one item attribute for each item in the item set, wherein the at least one item attribute is a property of the item, and training set data including user specific information, wherein the user specific information comprises at least one user-specific property that relates only to the user, and wherein the at least one user-specific property includes viewing time of at least one item browsed by the user, wherein the viewing time is an individual viewing time the user viewed the specific item;
 b) generating a training set of items comprising the at least one item browsed by the user;
 c) generating an item rating matrix by estimating user ratings for the items in the training set based on at least one rating predictor variable; wherein each rating predictor variable comprises one of the at least one user-specific property and the at least one item attribute; wherein an entry in the item rating matrix for a training set item e is generated according to:

$$\text{Item Rating}_e = f(x_1, x_2, \ldots, x_n)$$

wherein each $x_i$ is a value of the $i^{th}$ rating predictor variable, n is the number of rating predictor variables, and f is one of a non-linear combination and a linear combination of the rating predictor variables; wherein at least one of the rating predictor variables is the viewing time;
  d) estimating user ratings for unseen items in the item set based on the item rating matrix without using information about any other user; and,
  e) generating the recommendation set based on the estimated ratings.

21. The method of claim 20, wherein for the at least one user-specific property, the method includes obtaining at least one of the age of the user, the gender of the user, the degree of experience of the user in the same or a similar setting, and the mental state of the user.

22. The method of claim 20, wherein the at least one item attribute includes at least one of item complexity, presentation complexity, presentation length, novelty, familiarity, surprisingness, and position in the training set.

23. The method of claim 22, wherein the at least one item attribute further includes a measure of the at least one item attribute as perceived by the user.

24. The method of claim 20, wherein generating the item rating matrix includes:
  a) generating pre-processed training set data by applying zero or more statistical transformations to the training set; and,
  b) generating an entry in the item rating matrix for a training set item e based on a combination of the at least one item attribute and at least one rating predictor variable of the training set item e.

25. The method of claim 20, wherein generating the item rating matrix includes:
  a) generating pre-processed training set data by applying zero or more statistical transformations to the training set items; and,
  b) generating at least one item rating entry in the item rating matrix for a training set item e, the at least one item rating entry being used to generate the recommendation set, wherein the at least one item rating entry is generated according to $$\text{Item } Rating_e = \frac{c + a_1 x_1 + a_2 x_2 + \ldots + a_n x_n}{3}$$

where c is a constant, each $a_i$ is a coefficient corresponding to a rating predictor variable, and each $x_i$ is a value of the $i^{th}$ rating predictor variable and where the coefficients $a_i$ are generated according to a model based on a combination of the at least one item attribute and the at least one user-specific property.

26. The method of claim 20, wherein estimating user ratings for unseen items includes:
  a) generating pre-processed items by applying zero or more statistical transformation to the unseen items in the item set;
  b) generating a user profile having some subset of attributes of the pre-processed items along with at least one of an inferred user rating and explicit user rating, the inferred user rating being derived for some or all of the attributes from ratings in the item rating matrix; and,
  c) generating the estimated user ratings for some or all of the unseen items in the item set based on the estimated user ratings for the items.

27. The method of claim 21, wherein the method further includes generating estimated user ratings for unseen items in the item set and using the estimated user ratings to generate the recommendation set, wherein estimating the user rating for an unseen item e is done according to $$Rating_e = \frac{\sum_{i=1}^{|R|} r_i w_i}{\sum_{i=1}^{|W|} w_i}$$

in which $r_i$ is a rating of the $i^{th}$ attribute, $w_i$ is relative importance of the $i^{th}$ attribute, |R| is the number of attributes in the user profile and |W| is the number weights.

28. The method of claim 26, wherein the method further includes characterizing the at least one item attribute by at least one of a text attribute and a numeric attribute.

29. The method of claim 28, wherein for estimating user ratings for unseen items in the item set, the method includes generating the numeric attribute in the user profile according to $$UQ_i = \frac{\sum_{j=1}^{|Tp|} r_j q_{ij}}{\sum_{J=1}^{|Tp|} r_j}$$

in which $r_j$ is the rating of the $j^{th}$ positive item in the training set, $q_{ij}$ is the value of the $i^{th}$ numeric attribute for the $j^{th}$ positive item in the training set and |Tp| is the number of positive items and wherein a positive item is defined as an item having an attribute value greater than a predefined threshold value.

30. The method of claim 26, wherein for at least some numeric attributes, the method includes selecting a subset of items in the training set to generate the user profile, the subset being selected based on items in the training set having a rating greater than a predefined threshold value.

31. The method of claim 26, wherein the method includes generating the recommendation set by selecting n_rec unseen items having the highest estimated user ratings where n_rec is an integer value greater than or equal to one.

32. The method of claim 26, wherein the method includes generating the recommendation set by selecting the unseen items having an estimated user rating that is greater than a threshold value.

33. The method of claim 26 where the method includes placing a given unseen item in the recommendation set only when the estimated user rating of the given unseen item exceeds the ratings of all items previously viewed by the user.

34. The method of claim 20, wherein the method further includes processing the items in the item data store to generate the item property data.

* * * * *